UNITED STATES PATENT OFFICE.

HEINRICH OPPERMANN, OF BERNBURG, GERMANY.

PROCESS OF MAKING MEDICINAL PRODUCTS.

SPECIFICATION forming part of Letters Patent No. 646,034, dated March 27, 1900.

Application filed January 23, 1899. Serial No. 703,060. (No specimens.)

*To all whom it may concern:*

Be it known that I, HEINRICH OPPERMANN, a citizen of the German Empire, residing at Bernburg, Duchy of Anhalt, Germany, have invented certain new and useful Improvements in or Relating to the Manufacture of New Chloral Combinations; and I do hereby declare the following to be a full, clear, and exact description of the invention, such as will enable others skilled in the art to which it appertains to make and use the same.

The present invention relates to a process of production of new chloral combinations which are soluble in water and possess extraordinary disinfecting properties.

It is known that anhydrous chloral (trichloraldehyde) combines with water or with alcohol, forming chloralhydrate and chloralalcoholate, respectively, the reaction being accompanied by development of heat. Likewise it is a known fact that chloral will combine with bodies which readily yield water or which include hydroxyl groups—such as, for instance, glycerine. When such bodies are brought together with chloral, direct additional products are formed which have scarcely any antiseptic properties as compared with pure chloral.

The object of the present invention is a process for the production of chloral combinations which are non-volatile, or nearly so, soluble in water, and having very great antiseptic properties. For this purpose boracic acid or salicylic acid or milk-sugar and the like are dissolved in glycerine up to the point of saturation and heated until all the water is driven off from the solutions. Then one or more equivalents of choral are added to every equivalent of glycerine used. This will yield double combinations, clear in appearance and of syrup-like consistency at ordinary temperature, of chloral with boracic acid or salicylic acid or milk-sugar, which are non-volatile, or nearly so, are readily soluble in water, and are possessed, as already stated, of extraordinary antiseptic properties. To reduce these combinations to powder, they are mixed with magnesia hydrate or with magnesium-hydrocarbonate powder, with which, under development of heat, a permanent chemical combination is formed as a powder.

By way of example the following application of the process may be given: Heat one hundred and fifty parts of glycerine, free from water, with seventy-five parts of milk-sugar or boracic acid until a perfect dissolution is obtained, whereby all the water contained in the milk-sugar or in the boracic acid is driven off. This solution of milk-sugar or of boracic acid in glycerine is then allowed to cool down to 40° centigrade and exposed to the action, while being energetically stirred, of two hundred parts of chloral. The combination takes place under the evolution of heat, and after cooling the result is a clear thick liquid readily soluble in water.

The final product may be considered as a combination of the three bodies which were caused to react on each other—viz., of milk-sugar or boracic acid, as the case may be, with glycerine and with chloral—inasmuch as a solution in ready-made chloral-glycerine of milk-sugar or of boracic acid cannot be obtained. Boracic acid and the like may be heated for days in the above proportions or in any other without producing a combination or a dissolution. Nor can the possibility be admitted that when chloral is caused to react on boracic acid and the like dissolved in glycerine a retrograde decomposition takes place, for if that were so in time pure boracic acid or milk-sugar would be eliminated. Salicylic acid behaves in exactly the same manner as the boracic acid or milk-sugar chosen for the example, and all the remarks applied to these acids also apply to the former substance.

I do not limit myself to the use of milk-sugar in carrying out this process, as I may use its chemical equivalents in this process in place of it in carrying out the process.

Having now described my invention, I claim as new—

A process for producing non-volatile combinations of chloral having antiseptic properties, which consists in dissolving milk-sugar in glycerine to the point of saturation, heating the mixture to drive off the water, cooling the hot mixture to 40° centigrade, and then stirring in the chloral, substantially as set forth.

In testimony whereof I affix my signature in presence of two witnesses.

HEINRICH OPPERMANN.

Witnesses:
  OSCAR SCHMIDT,
  JEAN SCHMIDT.